United States Patent
Masuda

(10) Patent No.: US 10,040,624 B2
(45) Date of Patent: Aug. 7, 2018

(54) AIRCRAFT WATER TANK

(71) Applicant: The Yokohama Rubber Co., LTD., Minato-ku, Tokyo (JP)

(72) Inventor: Mitsutaka Masuda, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 50 days.

(21) Appl. No.: 15/031,926

(22) PCT Filed: Oct. 21, 2014

(86) PCT No.: PCT/JP2014/077970
§ 371 (c)(1),
(2) Date: Apr. 25, 2016

(87) PCT Pub. No.: WO2015/060309
PCT Pub. Date: Apr. 30, 2015

(65) Prior Publication Data
US 2016/0272413 A1    Sep. 22, 2016

(30) Foreign Application Priority Data

Oct. 25, 2013 (JP) .................................. 2013-222003

(51) Int. Cl.
*B65D 1/48* (2006.01)
*B65D 85/72* (2006.01)
(Continued)

(52) U.S. Cl.
CPC ............ *B65D 85/72* (2013.01); *B29C 53/602* (2013.01); *B29C 70/06* (2013.01); *B64D 11/00* (2013.01);
(Continued)

(58) Field of Classification Search
CPC .......... B65D 85/72; B65D 25/14; B65D 1/16; B65D 1/48
(Continued)

(56) References Cited

U.S. PATENT DOCUMENTS 4,614,279 A * 9/1986 Toth ...................... B29C 53/602
156/173
4,865,220 A * 9/1989 Wiegand ................ B65D 90/10
220/567.1
(Continued)

FOREIGN PATENT DOCUMENTS

CN      2649929     10/2004
CN    102168803      8/2011
(Continued)

OTHER PUBLICATIONS

International Search Report for International Application No. PCT/JP2014/077970 dated Feb. 3, 2015, 4 pages, Japan.

*Primary Examiner* — Stephen Castellano
(74) *Attorney, Agent, or Firm* — Thorpe North & Western

(57) ABSTRACT

A tank port includes a reinforcing sheet, an inner member, and an outer member. The reinforcing sheet is attached around a through-hole on the outer peripheral surface of a cylinder. The inner member includes an inner fitting plate portion attached to the inner peripheral surface of the cylinder and an inner cylindrical portion inserted into the through-hole. The outer member includes an outer cylindrical portion attached to the outer peripheral surface of the inner cylindrical portion protruding from an opening and an outer fitting plate portion attached around the opening of the reinforcing sheet. The entire periphery of the through-hole of the cylinder is reinforced by being disposed between the inner fitting plate portion and the reinforcing sheet.

1 Claim, 2 Drawing Sheets

(51) Int. Cl.
   *B29C 70/06* (2006.01)
   *B29C 53/60* (2006.01)
   *B64D 11/00* (2006.01)
   *B65D 1/16* (2006.01)
   *B65D 25/14* (2006.01)
   *B64D 11/02* (2006.01)
   *B29L 31/30* (2006.01)
   *B29L 31/00* (2006.01)
   *B29K 77/00* (2006.01)
   *B29K 655/02* (2006.01)

(52) U.S. Cl.
   CPC ............. *B65D 1/16* (2013.01); *B65D 1/48* (2013.01); *B65D 25/14* (2013.01); *B29K 2077/10* (2013.01); *B29K 2655/02* (2013.01); *B29L 2031/3076* (2013.01); *B29L 2031/712* (2013.01); *B29L 2031/7172* (2013.01); *B64D 11/02* (2013.01)

(58) Field of Classification Search
   USPC .......................................... 220/586, 661, 601
   See application file for complete search history.

(56) References Cited

U.S. PATENT DOCUMENTS

| | | | |
|---|---|---|---|
| 4,982,856 A | | 1/1991 | Stokes |
| 5,385,263 A | * | 1/1995 | Kirk .................... F17C 1/16 206/443 |
| 2011/0210128 A1 | | 9/2011 | Strack et al. |
| 2013/0292387 A1 | | 11/2013 | Spencer et al. |
| 2014/0191499 A1 | | 7/2014 | Campbell |
| 2015/0001229 A1 | | 1/2015 | Helmig et al. |
| 2015/0114971 A1 | | 4/2015 | Spencer et al. |

FOREIGN PATENT DOCUMENTS

| | | |
|---|---|---|
| JP | S58-090070 | 5/1983 |
| JP | S64-035174 | 2/1989 |
| JP | H09-0142572 | 6/1997 |
| JP | H09-04712 | 7/1997 |
| JP | H10-231997 | 9/1998 |
| JP | 2007-031165 | 2/2007 |
| JP | 2007-268929 | 10/2007 |
| JP | 2011-245796 | 12/2011 |
| WO | WO 2012/016163 | 2/2012 |
| WO | WO 2013/026140 | 2/2013 |
| WO | WO 2013/056785 | 4/2013 |

* cited by examiner

AIRCRAFT WATER TANK

This application is the national stage (Rule 371) of PCT/JP2014/077970 filed Oct. 21, 2014.

TECHNICAL FIELD

The present technology relates to water tanks for aircraft.

BACKGROUND ART

Water tanks for aircraft include a tank main body composed of a cylinder and domes disposed at both ends of the cylinder.

A known cylinder of such a water tank for an aircraft includes a laminate of an inner liner made of thermoplastic resin, a plurality of fiber-reinforced resin layers formed by winding reinforced fiber impregnated with thermosetting resin on the outer peripheral surface of the inner liner, and a honeycomb core layer disposed between the fiber-reinforced resin layers (See Japanese Unexamined Patent Application Publication Nos. 2007-268929A and 2011-245796A).

The cylinder of the water tank for an aircraft is provided with a tank port for taking water and air in and out.

The tank port is provided through a through-hole formed in the cylinder.

The through-hole interrupts the fiber of the fiber-reinforced resin layers and the honeycomb core layer in the tank port region of the cylinder, resulting in a decrease in strength for the internal pressure of the water tank for an aircraft.

Conventionally, the region around the tank port in the water tank for an aircraft is reinforced by filling the honeycomb core layer with a filler called a potting compound and curing the filler, and by disposing reinforcing sheets made of glass fiber between the core layer and the fiber-reinforced resin layers.

Unfortunately, the potting compound used for filling the core layer is expensive. The reinforcing sheets are disposed between the core layer and the fiber-reinforced resin layers while the reinforced fiber impregnated with thermosetting resin is wound on the outer peripheral surface of the inner liner, i.e., during filament winding. This work is complex and takes time.

Filling the core layer with the potting compound increases weight, which needs to be improved for a reduction in weight.

SUMMARY

The present technology provides a water tank for an aircraft that has high strength in the region around a tank port in a cylinder and has advantages in a reduction in component cost, an increase in work efficiency, and a reduction in weight.

A water tank for an aircraft according to the present technology includes a tank main body including a cylinder and domes disposed at both ends of the cylinder, and a tank port disposed on the cylinder. The cylinder includes a cylindrical inner liner, a plurality of fiber-reinforced resin layers disposed on an outer peripheral surface of the inner liner, and a core layer disposed between the fiber-reinforced resin layers. The cylinder includes a through-hole extending through the cylinder. The tank port includes an inner member including an inner cylindrical portion inserted into the through-hole and protruding from the outer peripheral surface of the cylinder and an inner fitting plate portion expanding outward in a radial direction from a base end of the inner cylindrical portion protruding from an inner peripheral surface of the cylinder over an entire periphery of the inner cylindrical portion, the inner fitting plate portion being attached around the through-hole on the inner peripheral surface of the cylinder, a reinforcing sheet including an opening for inserting the inner cylindrical portion protruding from the outer peripheral surface of the cylinder, the reinforcing sheet being attached to a region, corresponding to an entire periphery of the through-hole, of the outer peripheral surface of the cylinder, the reinforcing sheet reinforcing the region of the outer peripheral surface, and an outer member including an outer cylindrical portion attached to an outer peripheral surface of the inner cylindrical portion protruding from the opening and an outer fitting plate portion expanding outward in a radial direction from a base end of the outer cylindrical portion over an entire periphery of the outer cylindrical portion, the outer fitting plate portion attached to the reinforcing sheet.

In accordance with the present technology, the entire periphery of the through-hole of the cylinder is reinforced by being disposed between the inner fitting plate portion and the reinforcing sheet.

Accordingly, the force generated outward in the radial direction and in the circumferential and axial directions of the cylinder due to the internal pressure of the water tank for an aircraft is received through the inner fitting plate portion and the reinforcing sheet by the entire periphery of the through-hole of the cylinder in a dispersed manner.

The use of the inner fitting plate portion and the reinforcing sheet eliminates the needs to fill the core layer with a potting compound and to provide reinforcing sheets between the core layer and the fiber-reinforced resin layers and provides both strength in the radial direction of the cylinder and strength in the circumferential and axial directions of the cylinder, to the region around the tank port.

This structure is advantageous in a reduction in component cost, an increase in work efficiency, and a reduction in weight of the water tank for an aircraft.

DETAILED DESCRIPTION

Next, embodiments of the present technology will be described with reference to the drawings.

Figure 1:
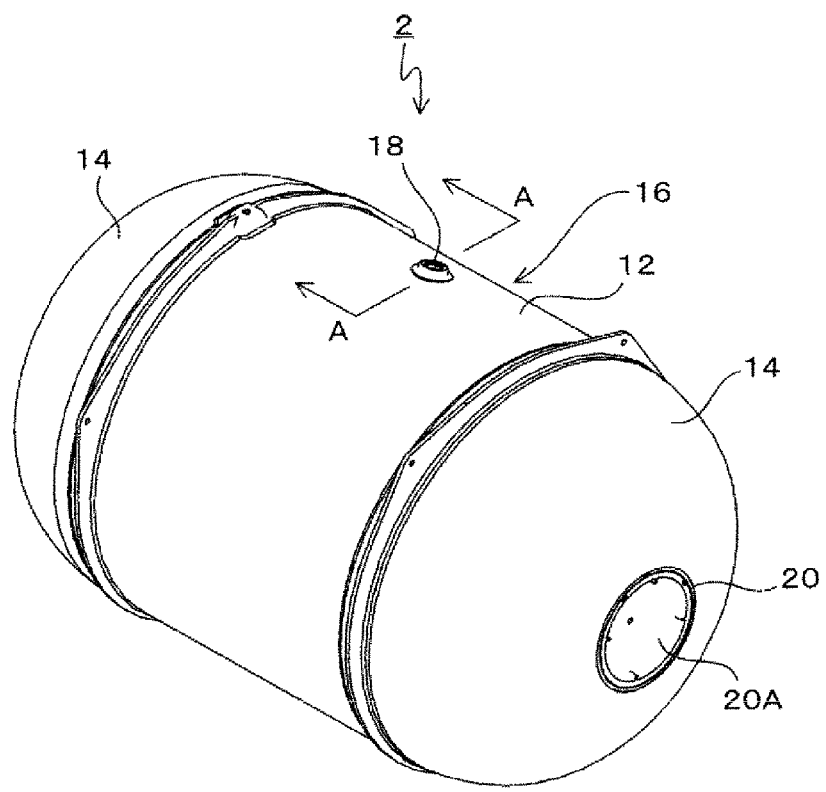
FIG. 1 is a perspective view of a water tank for an aircraft according to an embodiment.

With reference to FIG. 1, an water tank 2 for an aircraft for storing drinking water includes a tank main body 16 including a cylinder 12 and domes 14 disposed at both ends of the cylinder 12, and a tank port 18 disposed on the cylinder 12.

A metal cap 20 is disposed at the center of each dome 14, and a lid 20A is removably attached to the metal cap 20.

The tank main body 16 includes an inner liner 22, a plurality of fiber-reinforced resin layers 24 disposed on the outer peripheral surface of the inner liner 22, and a core layer 26 disposed between the fiber-reinforced resin layers 24.

The inner liner 22 defines a space for storing drinking water and is formed by blow-molding thermoplastic resin, such as ABS resin.

The inner liner 22 includes a cylindrical portion 22A and dome portions disposed at both ends of the cylindrical portion 22A.

The fiber-reinforced resin layers 24 in this embodiment are constituted by three layers consisting of a first fiber-reinforced resin layer 24A, a second fiber-reinforced resin layer 24B, and a third fiber-reinforced resin layer 24C.

The first fiber-reinforced resin layer 24A is formed by filament winding in which reinforced fiber (filaments) impregnated with thermosetting resin is wound on the outer peripheral surfaces of the cylindrical portion 22A and the dome portions of the inner liner 22 and is cured by heat.

The second fiber-reinforced resin layer 24B is formed by filament winding in which reinforced fiber (filaments) impregnated with thermosetting resin is wound on the outer peripheral surface of the first fiber-reinforced resin layer 24A and is cured by heat.

The core layer 26 has a honeycomb core structure and is provided only in the region, corresponding to the cylindrical portion 22A of the inner liner 22, of the outer peripheral surface of the second fiber-reinforced resin layer 24B.

The core layer 26 can be formed with any conventionally known reinforced fiber, such as aromatic polyamide fiber, and the honeycomb core structure can be any conventionally known structure.

The third fiber-reinforced resin layer 24C is formed by filament winding in which reinforced fiber (filaments) impregnated with thermosetting resin is wound on the outer peripheral surface of the core layer 26 and the outer peripheral surfaces, corresponding to the dome portions of the inner liner 22, of the second fiber-reinforced resin layer 24B and is cured by heat in the same manner as the second fiber-reinforced resin layer 24B.

The thermosetting resin for the first, second, and third fiber-reinforced resin layers 24A, 24B, and 24C can be any conventionally known thermosetting resin, such as epoxy resin.

The reinforced fiber for the first, second, and third fiber-reinforced resin layers 24A, 24B, and 24C can be any conventionally known fiber, such as glass fiber and carbon fiber.

The cylinder 12 having the above-described structure includes a through-hole 1202 for disposing the tank port 18.

Figure 2:
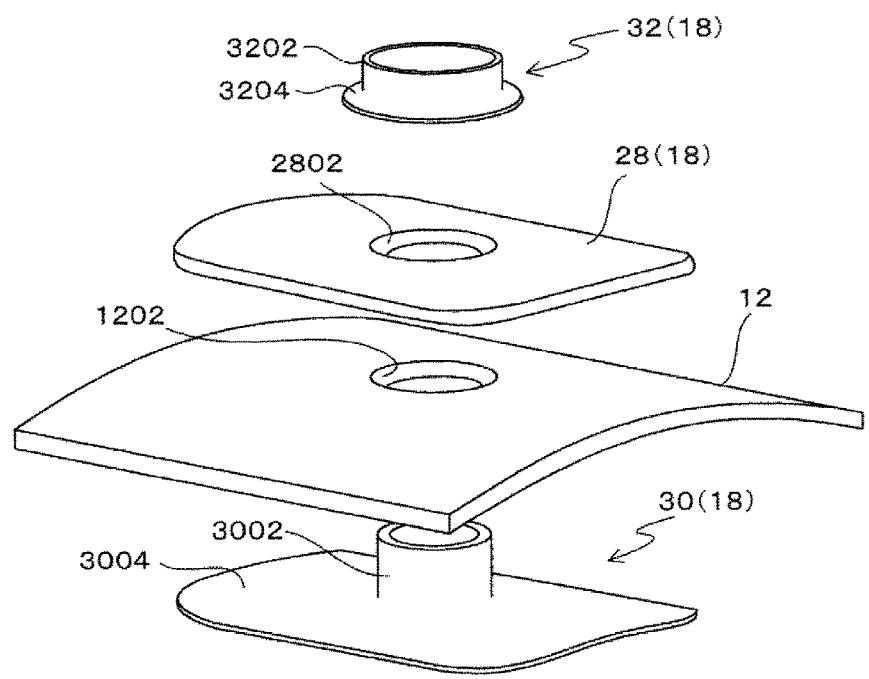
FIG. 2 is an exploded perspective view of a tank port region of the water tank for an aircraft according to an embodiment.
Figure 3:
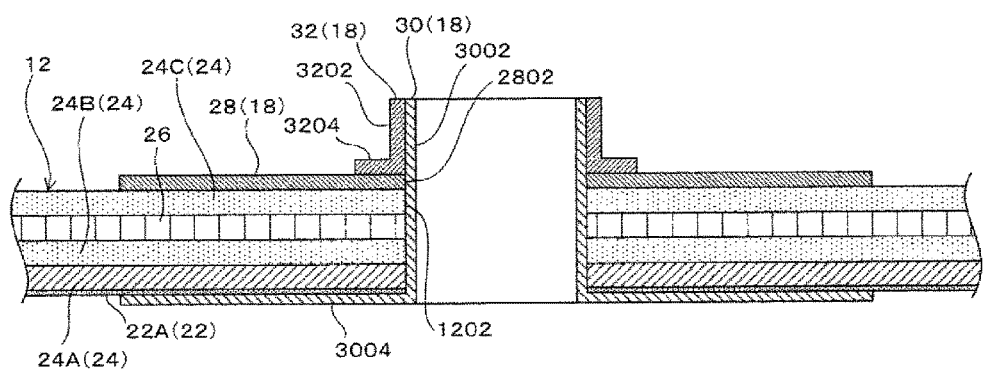
FIG. 3 is a cross-sectional view of a line A-A in FIG. 1.

With reference to FIGS. 2 and 3, the tank port 18 includes a reinforcing sheet 28, an inner member 30, and an outer member 32.

The reinforcing sheet 28 is attached around the through-hole 1202 on the outer peripheral surface of the cylinder 12 with adhesive.

The reinforcing sheet 28 includes an opening 2802.

The reinforcing sheet 28 is formed with fiber-reinforced resin.

The thermosetting resin used for the reinforcing sheet 28 can be any conventionally known thermosetting resin, such as epoxy resin.

The reinforced fiber for the reinforcing sheet 28 can be any conventionally known fiber, such as glass fiber and carbon fiber.

The reinforcing sheet 28 is attached to the region, corresponding to the entire periphery of the through-hole 1202, of the outer peripheral surface of the cylinder 12 with the opening 2802 concentric with the through-hole 1202. The reinforcing sheet 28 reinforces the region, corresponding to the entire periphery of the through-hole 1202, of the cylinder 12.

The inner member 30 includes an inner cylindrical portion 3002 and an inner fitting plate portion 3004.

The inner cylindrical portion 3002 is inserted from the inside of the cylinder 12 into the through-hole 1202 and protrudes from the outer peripheral surface of the cylinder 12.

The inner fitting plate portion 3004 expands outward in the radial direction of the inner cylindrical portion 3002 from the base end of the inner cylindrical portion 3002 protruding from the inner peripheral surface of the cylinder 12 over the entire periphery of the inner cylindrical portion 3002.

The inner fitting plate portion 3004 is attached to the inner peripheral surface of the inner liner 22 with adhesive.

The reinforcing sheet 28 and the inner fitting plate portion 3004 in this embodiment have an area enough to withstand shear stress due to the internal pressure of the water tank 2 for an aircraft.

The inner fitting plate portion 3004 and the reinforcing sheet 28 have the same area and contour to efficiently reinforce the region, around the tank port 18, of the cylinder 12.

The outer member 32 includes an outer cylindrical portion 3202 and an outer fitting plate portion 3204.

The outer cylindrical portion 3202 is attached to the outer peripheral surface of the inner cylindrical portion 3002 protruding from the opening 2802, with adhesive.

The outer fitting plate portion 3204 expands outward in the radial direction of the outer cylindrical portion 3202 from the base end of the outer cylindrical portion 3202 over the entire periphery of the outer cylindrical portion 3202.

The outer fitting plate portion 3204 is attached around the opening 2802 of the reinforcing sheet 28 with adhesive.

In this embodiment, the tank port 18 includes the reinforcing sheet 28, the inner member 30, and the outer member 32, and the entire periphery of the through-hole 1202 of the cylinder 12 is reinforced by being disposed between the inner fitting plate portion 3004 and the reinforcing sheet 28.

Accordingly, the force generated outward in the radial direction of the cylinder 12 due to the internal pressure of the water tank 2 for an aircraft is received through the inner fitting plate portion 3004 and the reinforcing sheet 28 by the entire periphery of the through-hole 1202 of the cylinder 12 in a dispersed manner.

The force generated in the circumferential and axial directions of the cylinder 12 due to the internal pressure of the water tank 2 for an aircraft is received through the inner fitting plate portion 3004 and the reinforcing sheet 28 by the entire periphery of the through-hole 1202 of the cylinder 12 in a dispersed manner.

This structure provides both strength in the radial direction of the cylinder 12 and strength in the circumferential and axial directions of the cylinder 12, to the region, around the tank port 18, of the cylinder 12.

The reinforcement of the region, around the tank port 18, of the cylinder 12 with the inner fitting plate portion 3004 and the reinforcing sheet 28 eliminates the conventional needs to fill and cure the honeycomb core layer 26 with a potting compound and to provide reinforcing sheets made of glass fiber between the core layer 26 and the fiber-reinforced resin layers 24. This elimination is advantageous in a reduction in component cost and an increase in work efficiency.

Eliminating the filling of a potting compound is also advantageous in a reduction in weight of the water tank 2 for an aircraft.

The invention claimed is:

1. A water tank for an aircraft, comprising:

a tank main body including a cylinder and domes disposed at both ends of the cylinder; and a tank port disposed on the cylinder;

the cylinder including a cylindrical inner liner, a plurality of fiber-reinforced resin layers disposed on an outer peripheral surface of the inner liner, and a core layer disposed between the fiber-reinforced resin layers;

the cylinder including a through-hole extending through the cylinder; and the tank port including:

an inner member including an inner cylindrical portion inserted into the through-hole and protruding from an outer peripheral surface of the cylinder and an inner fitting plate portion expanding outward in a radial direction from a base end of the inner cylindrical portion protruding from an inner peripheral surface of the cylinder over an entire periphery of the inner cylindrical portion, the inner fitting plate portion being attached around the through-hole on the inner peripheral surface of the cylinder;

a reinforcing sheet including an opening for inserting the inner cylindrical portion protruding from the outer peripheral surface of the cylinder, the reinforcing sheet being attached to a region, corresponding to an entire periphery of the through-hole, of the outer peripheral surface of the cylinder, the reinforcing sheet reinforcing the region of the outer peripheral surface; and an outer member including an outer cylindrical portion attached to an outer peripheral surface of the inner cylindrical portion protruding from the opening and an outer fitting plate portion expanding outward in a radial direction from a base end of the outer cylindrical portion over an entire periphery of the outer cylindrical portion, the outer fitting plate portion attached to the reinforcing sheet, the reinforcing sheet and the inner fitting plate portion having a same contour and a same area capable of withstanding shear stress due to internal pressure of the tank.

* * * * *